(12) United States Patent
Hoteit et al.

(10) Patent No.: US 9,810,146 B2
(45) Date of Patent: Nov. 7, 2017

(54) CALCIUM SULFATE LOOPING CYCLES FOR SOUR GAS COMBUSTION AND ELECTRICITY PRODUCTION

(71) Applicant: Saudi Arabian Oil Company, Dhahran (SA)

(72) Inventors: Ali Hoteit, Abqaiq (SA); Mourad Younes, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 764 days.

(21) Appl. No.: 14/334,077

(22) Filed: Jul. 17, 2014

(65) Prior Publication Data

US 2016/0017799 A1    Jan. 21, 2016

(51) Int. Cl.
| | |
|---|---|
| C01B 3/36 | (2006.01) |
| F02C 3/22 | (2006.01) |
| F23C 10/01 | (2006.01) |
| F23J 7/00 | (2006.01) |
| F23C 10/08 | (2006.01) |
| F23C 13/08 | (2006.01) |

(52) U.S. Cl.
CPC ............... *F02C 3/22* (2013.01); *C01B 3/36* (2013.01); *F23C 10/01* (2013.01); *F23C 10/08* (2013.01); *F23C 13/08* (2013.01); *F23J 7/00* (2013.01); *C01B 2203/0255* (2013.01); *C01B 2203/1241* (2013.01); *F23C 2900/99008* (2013.01); *Y02E 20/16* (2013.01); *Y02E 20/346* (2013.01)

(58) Field of Classification Search
CPC ...................................... F23C 10/01
USPC .......................................... 431/7
See application file for complete search history.

(56) References Cited

U.S. PATENT DOCUMENTS

| | | | |
|---|---|---|---|
| 8,110,012 B2 | 2/2012 | Chiu et al. | |
| 8,496,909 B2 | 7/2013 | Ramkumar et al. | |
| 8,512,661 B2 | 8/2013 | Fan et al. | |
| 2009/0052467 A1 | 2/2009 | Kaidar et al. | |
| 2010/0025293 A1* | 2/2010 | Kressmann | C10G 65/12 208/97 |
| 2012/0214106 A1* | 8/2012 | Sit | F23C 10/01 431/7 |
| 2013/0255272 A1 | 10/2013 | Ajhar et al. | |

FOREIGN PATENT DOCUMENTS

| | | |
|---|---|---|
| EP | 2 610 216 | 7/2013 |
| FR | 2 903 994 | 1/2008 |
| WO | WO 2007/057934 | 5/2007 |

OTHER PUBLICATIONS

L.F. De Diego et al: "Performance of Cu-and Fe-based oxygen carriers in a 500 Wth CLC unit for sour gas combustion with high H2S content", International Journal of Greenhouse Gas Control, vol. 28, Jul. 12, 2014 (Jul. 12, 2014), pp. 168-179, XP055224722, GB ISSN: 1750-5836, DOI: 10.1016/j.ijggc.2014.06.026.

\* cited by examiner

*Primary Examiner* — Avinash Savani
(74) *Attorney, Agent, or Firm* — Leason Ellis LLP

(57) ABSTRACT

A calcium looping combustion process for sour gas combustion comprising a system that includes several reaction zones. The system is configured to provide oxygen transfer media production, generation of a syngas product stream, and in-situ $H_2S$ removal from the sour gas. The system is also configured such that the calcium-based transfer media and the calcium-based oxygen carrier are reproduced via reactions in another reaction zone, and recirculated in the system.

28 Claims, 1 Drawing Sheet

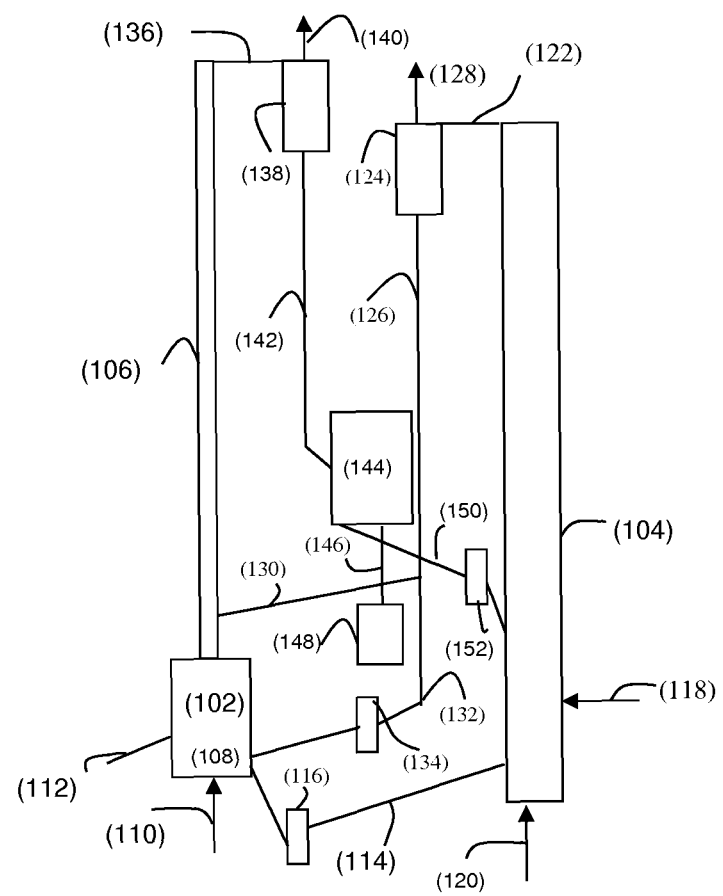

CALCIUM SULFATE LOOPING CYCLES FOR SOUR GAS COMBUSTION AND ELECTRICITY PRODUCTION

TECHNICAL FIELD

The present invention relates to a process to produce heat, steam, or power from the combustion of sour gas using a calcium-based looping combustion process. More specifically, the present invention relates to a calcium-based looping combustion of sour gas process involving the in-situ removal of sulfur from the sour gas.

BACKGROUND

As the need for energy continues to grow worldwide, the need for additional energy sources also grows. Non-renewable energy sources remain the major supply of energy throughout the world as renewable energy sources remain too low in quantity to meet much of the demand, and their development has been slow and limited to specific localities. While established non-renewable energy sources (e.g., recoverable coal, conventional oil and natural gas) remain the major energy sources, energy producers must now look to other non-renewable energy sources such as unconventional oil resources (e.g., oil shale, tar-sands, and heavy crude) and unconventional natural gas resources (e.g., gas in pressurized aquifers and coal seams) to meet the increasing demand.

Among these unconventional non-renewable energy sources is sour gas fuel. Sour gas is a source of energy that must be utilized because it has a much longer lifetime as compared with other non-renewable sources. Sour gas is a colorless, flammable, and corrosive natural gas that contains significant levels of hydrogen sulfide ($H_2S$).

Combustion is a commonly used reaction in the field of power generation and one that, in certain instances, can utilize sour gas as fuel. Sour gas, however can be damaging to the mechanical parts of the combustion system at high temperatures and pressures under gas turbine system conditions, and is low in calorific value. Further, when $H_2S$ is exposed to air, it easily oxidizes into a sulfur oxide ($SO_x$) such as $SO_2$—an air pollutant. In some instances, direct combustion of sour gas in a gas turbine is not even possible due to the composition and the physical characteristics of the gas, particularly if the sour gas has an $H_2S$ content above 5-20%. Thus, sour gas has not previously been considered a particularly useful fossil fuel for combustion processes.

The increasing worldwide demand for energy, however, has forced the use of sour gas as an energy source. There are many global undeveloped and underdeveloped sour gas reservoirs. If these resources are to be used for the generation of power, the ability of a combustion process to handle quantities of $H_2S$ is necessary in order to make such application possible. Not surprisingly, much effort is underway worldwide to reduce the economic impact of $H_2S$ and sulfur management for sour gas fuels.

Conventionally, in order to avoid the corrosive effects and the pollution associated with combustion of sour gas, pretreatment of the sour gas was required to substantially remove the sulfur compounds from the gas stream—a process known as "sweetening." For example, an amine gas treating process can be used to "sweeten" the sour gas (i.e., remove the $H_2S$). The major shortcoming of processes for sweetening sour gas is that they are very complex and costly.

Thus, there is a need for a process that utilizes unconventional energy resources to produce energy in an efficient and cost-effective manner. In particular, there is a need for sour gas combustion processes with high efficiency in energy conversion, but without the costly pretreatment of $H_2S$.

SUMMARY

The present invention is directed to process for the calcium-based chemical looping combustion (CLC) of sour gas to produce product gas for use in power generation. More specifically, the present invention relates to a CLC process of sour gas that features at least in part in-situ $H_2S$ removal, and oxygen transfer media production.

In one embodiment, a bed of a calcium-based transfer media (e.g., CaO) is disposed within a lower portion of a fuel reactor and a stream of $CO_2$ and steam is then used to fluidize the bed. Once fluidized, the bed of CaO reacts with the $H_2S$ of a sour gas feed injected into the fuel reactor to produce CaS (in-situ $H_2S$ removal), which is then transported to an air reactor to be oxidized.

In the air reactor, air is injected and oxidizes the CaS to produce a calcium-based oxygen transfer media (e.g., $CaSO_4$). Further, limestone is injected into air reactor where, due to the operating conditions of the air reactor, it calcines producing CaO and $CO_2$. The CaO produced in the air reactor is the circulated back to the bed in the lower portion of the fuel reactor, and the $CaSO_4$ produced in the air reactor can be circulated to the fuel reactor and/or the riser.

In the riser, the $CH_4$ of the sour gas reacts with the injected $CaSO_4$ in a stream of CO2 and steam to produce a product gas stream (e.g., syngas) and CaS. The product gas stream is then separated from the CaS using a gas-solid separator. The CaS particles from the reaction in the riser are then routed to a reactive hopper where a portion of them are oxidized into $CaSO_4$. The resulting $CaSO_4$ and remaining CaS is then transported from the reactive hopper to the air reactor for further circulation throughout the system. The product gas stream can be utilized in other related applications such as power generation systems or gas turbine systems combined cycles.

This invention provides a distinct advantage over other CLC processes involving sour gas in that it allows for the full conversion of the sour gas, whereas most CLC sour gas processes will have a small portion of not fully converted gas products in the product stream. Additionally, the present invention reduces the reaction time in the fuel reactor, which allows for reductions in the size of the fuel reactor and the overall cost of the process compared with previous CLC processes.

BRIEF DESCRIPTION OF THE DRAWING FIGURES

A more complete understanding of the invention and its many features and advantages will be attained by reference to the following detailed description and the accompanying drawing. It is important to note that the drawing illustrates only one embodiment of the present invention and therefore should not be considered to limit its scope.

FIG. 1 is a schematic of a calcium looping combustion process in accordance with at least one embodiment of the present application.

DETAILED DESCRIPTION OF CERTAIN EMBODIMENTS

The present application relates to a calcium-based chemical looping combustion (CLC) of sour gas process involving the in-situ removal of sulfur from the sour gas. In a CLC process, a solid metal oxide oxygen carrier is typically used to oxidize the fuel stream in a fuel reactor. This results in the production of $CO_2$ and $H_2O$. The reduced form of the oxygen carrier is then transferred to the air reactor, where it is contacted with air, re-oxidized to its initial state, and then returned back to the fuel reactor for further combustion reactions.

In general, the overall heat of a CLC process will be the sum of the two heat states, exothermic during oxidation and endothermic during reduction, which is equivalent to the heat released in a convention combustion reaction. Accordingly, one advantage of a CLC process is that minimal extra energy is required to capture $CO_2$ while still maintaining a combustion efficiency similar to direct combustion processes. More precisely, there is minimum energy penalty for $CO_2$ capturing in a CLC process, estimated at only 2-3% efficiency lost. Additionally, NO formation is reduced in the CLC process compared with direct combustion processes as the oxidation reaction occurs in the air reactor in the absence of fuel and at a temperature of less than 1200° C.—above which $NO_x$ formation increases considerably. Thus, the lack of $NO_x$ formation makes $CO_2$ capturing in CLC processes less costly compared with other combustion methods because $CO_2$ does not need to be separated from the NOx gas prior to capture. Further, in contrast with other combustion processes, $CO_2$ products in CLC processes can be separated from other gases and captured without the use of additional step or equipment.

The CLC process of the present application is designed to overcome the deficiencies associated with direct combustion processes and conventional CLC processes as they relate to the combustion of sour gas. In particular, the calcium-based CLC process of the present application allows for the in-situ removal of $H_2S$ and the full conversion of sour gas during the combustion reaction. Further, the process of the present application is designed to produce heat, steam, and/or power from the combustion of a sour gas feed using a calcium-based looping process. Other advantages associated with the present application will be appreciated in view of the following description.

FIG. 1 illustrates an exemplary system 100 for performing the calcium-based chemical looping combustion of sour gas in accordance with the present application. FIG. 1 likewise shows an exemplary flow scheme that depicts a calcium-based CLC process in accordance with the present application. In one or more embodiments, as exemplified in the system 100 of FIG. 1, the CLC system can have at least 3 different reaction zones: a first reaction zone defined by a fuel reactor 102, a second reaction zone defined by an air reactor 104, and a third reaction zone defined by a riser 106, which can be operatively connected to the fuel reactor 102 and the air reactor 104.

The fuel reactor 102 can take any number of suitable forms and is designed to allow for the combustion of a fuel or the like therein. The fuel reactor 102 is thus defined by a structure (housing) that defines a hollow interior in which fuel combustion occurs. A bed material (fluidized bed) which provides the oxygen for the combustion in the fuel reactor 102 can be disposed within a portion 108 (e.g., a lower portion as illustrated) of the fuel reactor 102. It will be appreciated that oxygen carrier can take any number of different forms including those described herein.

Any number of different techniques can be used to contain and hold the bed material in place within the fuel reactor 102 including but not limited to placing the bed material on a substrate or support structure that is disposed within the lower portion 108. For example, a perforated horizontal plate can be provided in the lower portion 108 and the bed material rests along such perforated plate. The perforations in the horizontal plate allow for fluid flow through the plate and thus, allow for a fluid, such as a gas, to flow not only through the plate but also through the bed material resting thereon. This allows the bed material to act as a fluidized bed. The bed material serves as the oxygen carrier that provides oxygen for the combustion in the fuel reactor 102.

In one or more embodiments, the bed material in the fuel reactor 102 can be comprised of a calcium-based transfer media. In exemplary embodiments, the calcium-based transfer media in the fuel reactor 102 is calcium oxide (CaO), also referred to herein as "lime." In other variations, the calcium-based transfer media bed in the fuel reactor 102 can also be comprised of limestone ($CaCO_3$). The calcium-based transfer media is a reactive media that can transfer one or more elements, such as oxygen, under reaction conditions. The calcium-based transfer media bed can be fluidized by a suitable fluid, such as a stream of $CO_2$ or by another suitable fluid stream (gas stream). In one or more variations, a stream comprising both $CO_2$ and steam is used to fluidize the calcium-based transfer media bed. In at least one variation, the suitable fluid can comprise depleted air from the air reactor. In another variation, a part of the depleted air at an outlet of a steam turbine is connected to the air reactor to fluidize the lime bed in the fuel reactor. The depleted air can contain 2 to 5% of oxygen and can enhance the reactions in the fuel reactor 102 and the riser 106. Referring to FIG. 1, the stream of $CO_2$ and steam is transported via transport line 110 and is used to fluidize the bed of lime within the lower portion 108 of the fuel reactor 102 by flowing freely through the bed material.

It will be understood that the diameter of the fuel reactor 102 is preferably designed based on gas superficial velocities. The gas velocity needed for good fluidization gas distribution and good transfer media mixing in the bottom portion 108 of the fuel reactor 102 is between about 0.15 and 0.8 m/s, and preferably between about 0.25 and 0.5 m/s, at least according to one exemplary embodiment. The fluidization gas velocity will not exceed the terminal velocity of the calcium-based transfer media particles. Exemplary operating temperatures in the bottom portion 108 of the fuel reactor 102 are varied between 700 and 1200° C.

In one or more variations, the fuel (e.g. sour gas) can be injected into an inlet 112 formed in the lower portion of the fuel reactor 102 that contains the calcium-based transfer media bed (e.g., lime). In one or more variations, the fuel is a sour gas feed. In one or more variations, the sour gas can be injected into a location in the fuel reactor 102 that is downstream of the calcium-based transfer media bed. In an exemplary embodiment, the $H_2S$ of the sour gas reacts with the CaO (lime bed) in the lower portion of the fuel reactor 102 (e.g., in-situ $H_2S$ removal) to produce a reduced calcium-based transfer media, (e.g., calcium sulfide [CaS]). The resulting CaS can be transported to the air reactor 104 via transport line 114 to be re-oxidized for recirculation in the system 100. In one or more variations, transport line 114 can be connected to a loop seal 116 to ensure gas tightness between the fuel reactor 102 and the air reactor 104. In variations in which depleted air is used to fluidize the bed of calcium-based transfer media, the depleted air can enhance the reactions of the calcium-based transfer media with the $H_2S$, thereby increasing $H_2S$ removal.

The residence time of the sour gas feed in the fuel reactor 102 where it reacts with the lime can be between about 1 and 800 seconds, and preferably between about 100 and 500 seconds. It will be appreciated that these values are merely exemplary in nature. The reaction between $H_2S$ and CaO is an exothermic reaction, which increases the total efficiency of the chemical looping unit. The sour gas stream can have an $H_2S$ concentration of between about 0.1 and 75%, preferably between 0.1 and 50%. In one or more embodiments, the ratio of Ca to S can be between 1 and 3, preferably between about 1.2 and 2.5.

In one or more variations, at least two reactions take place in the air reactor 104: calcination and oxidation. The CaO (lime) that forms a bed in the lower portion 108 of the fuel reactor 102 is produced in the air reactor 104 via calcination. To produce the lime in the air reactor 104, $CaCO_3$ (limestone) can be injected into the air reactor 104 via transport line 118. The particle size fraction of limestone particles injected into the air reactor 104 can be between 70 and 300 microns, preferentially between 100 and 250 microns. The operation temperature of the air reactor 104 can be between 800 and 1300° C., and preferably between 850 and 1300° C. In exemplary embodiments, the limestone in the air reactor 104 undergoes a calcination reaction because of the operating conditions of the air reactor 104 (e.g., temperature above 850° C.). As such, the limestone ($CaCO_3$) calcines (decomposes) into CaO (lime) and $CO_2$.

Further, an oxidation reaction occurs in the air reactor 104, as the reduced calcium-based transfer media (CaS) transported from the fuel reactor 102 via transport line 114 reacts with the oxygen ($O_2$) present in the air reactor 104 to produce a calcium-based oxygen transfer media ($CaSO_4$) (which under reaction conditions is reduced to produce oxygen). The oxygen needed for the oxidation reaction in the air reactor 104 can be injected into the air reactor via transport line 120. The CaO and $CaSO_4$ products produced in the air reactor 104 are then transported back to the fuel reactor and/or the riser. This portion of the CaO and $CaSO_4$ products exit the air reactor 104 via transport line 122 and enter a gas-solid separator 124 (e.g., a cyclone). The CaO and $CaSO_4$ solid particles exit the gas-solid separator 124 via transport line 126, while the excess gas (depleted air) exit the gas solid separator 124 via transport line 128.

A portion of the CaO and $CaSO_4$ products in transport line 128 are then routed to the riser 106 and the fuel reactor 102 via transport line 130. The other portion of the CaO and $CaSO_4$ products in transport line 128 are recirculated to the bottom portion 108 of the fuel reactor 102 via transport line 132. In an exemplary embodiment, transport line 132 can be connected to a loop seal 134 in order to ensure the gas tightness between the air reactor 104 and the fuel reactor 102. The ability of $CaSO_4$ to be recirculated to the fuel reactor 102 and riser 106 as oxygen carriers allow for the full conversion of the sour gas to the product gas.

In one or more variations, $SO_2$ byproducts can be present within the air reactor 104 as a result of the sour gas reactions in the fuel reactor 102 and/or the riser 106. The $SO_2$ byproducts are eliminated from the air reactor 104 via reaction with a suitable, calcium-based sorbent material that is introduced into the air reactor 104. In one or more variations, the sorbent material is limestone (injected via transport line 118). The reaction between $SO_2$ and the calcium sorbent in the air reactor 104 results in the formation of $CaSO_4$, which can then be transported back to the fuel reactor 102 and/or the riser 104. In these variations, the injection of the calcium-based sorbent into the air reactor 104 prevents the potential pollution effects of $SO_2$.

As explained above, a portion of the $CaSO_4$ (calcium-based oxygen transfer media) produced in the air reactor 104 is transported to the riser 106. In the riser 106, the $CaSO_4$ will serve as a non-metal oxygen transfer media or oxygen carrier. The sour gas injected via transport line 112 into the fuel reactor 102 flows from the fuel reactor 102 to the riser 106 in a stream of CO2, steam, and or depleted air. In the riser 106, a combustion reaction occurs as the $CaSO_4$ reacts with the $CH_4$ of the sour gas in the stream of $CO_2$, steam, and/or depleted air. This combustion reaction produces CaS and the product gas stream, which can comprise CO, and $H_2$. In one or more variations, the product gas stream can also be comprised of $CO_2$, $H_2O$, $N_2$, and trace amounts of $H_2S$. In one or more variations, the product gas stream is syngas. In one or more variations, the product gas stream can be used for other applications, such as a power generation via a gas turbine combined cycle. In variations in which depleted air is used to fluidize the bed of oxygen carriers in the fuel reactor 102, the depleted air can enhance the reactions of the $CaSO_4$ with $CH_4$, thereby increasing the production of product gas stream (e.g., syngas). The reaction between the $CaSO_4$ and the $CH_4$ of the sour gas in the riser 106 is slightly exothermic, and the temperature in the riser 106 will increase as a result. The operating temperature in the riser is varied between 700 and 1200° C.

In one or more variations, the fuel reactor and the riser can be integrated into a common structure and thus, while the drawings and description thereof discusses these two components separately, it is within the scope of the present invention that the two components can be integrated into one in some embodiments. As is known, the riser forms a riser channel in its interior and typically includes inlets (e.g., feed tubes) that allow material to be added to the riser as fuel (reactive components) that reacts in the riser with other components present therein (which can be formed as a result of combustion in the fuel reactor).

The CaS and the product stream exit the riser 106 via transport line 136. The CaS and the product gas stream are then routed to a second gas-solid separator 138 (e.g. a cyclone), where the CaS particles can be separated from the product gas stream. The product gas exits the second gas-solid separator 138 via transport line 140, which routes the product gas out of the system. After separation from the product gas stream, the CaS particles exit the separator 138 and are transported via transport line 142 to a reactive hopper 144 operated in a dense fluidized bed.

In one or more variations, air can be injected into the reactive hopper 144 such that at least a portion of the CaS is re-oxidized to $CaSO_4$. In these variations, the injection of air in the reactive hopper 144 also helps to maintain the fluidization of $CaSO_4$ back to the riser. Further, in order to maintain pressure balance of the system 100, a portion of the CaSO4 product in the reactive hopper 144 can be removed from the system 100 via a collection line 146 to a storing reactor 148.

The remaining CaS particles in the reactive hopper 144 are then routed via transport line 150 (connected to loop seal 152) back to the air reactor 104 to be re-oxidized to $CaSO_4$, thereby completing the calcium loop. In variations in which $CaSO_4$ is produced in the reactive hopper 144, the $CaSO_4$ particles can be transported along with the CaS particles to the air reactor 104 via transport line 150.

In certain variations, the system 100 can generate heat and steam as byproducts. The generation of heat and steam can occur from the outlet stream of the air reactor. The hot depleted air at 1200° C. exiting the air reactor can be used to produce heat and steam and power using a steam turbine.

In one or more variations, the system 100 can also produce gypsum ($CaSO_4$) as a byproduct. At the bottom of the air reactor the gypsum can exit the system. The control of the mass, heat, and pressure balance of the system control the quantity of gypsum extracted from the loop. Thus, in at least one variation, the system can be coupled with a process to manufacture cement, as gypsum is a raw material for CSAB cement. Coupling the present system with a cement manufacturing process can be a benefit as it can reduce the overall emission of $CO_2$ typically associated with both processes, and therefore would result in cost savings.

EXAMPLE

The following example is provided to better illustrate an embodiment of the present invention, but it should not be construed as limiting the scope of the present invention.

In this example, the calcium-based transfer media that is disposed in the lower portion 108 of the fuel reactor 102 is limestone, and it has a density of 2750 kg/m$^3$. The sour gas feed injected into the fuel reactor has the following composition (wt %): $CH_4$ (58.8%), $H_2S$ (20.9%), $N_2$ (13%), and $CO_2$ (7.3%). The amount of lime necessary for a fluidized bed reactor is calculated along with the flow rate of lime to the reactor. The lime reduces the $H_2S$ content of the sour gas to the equilibrium value of 397 ppm, and with the inlet volume fraction of $yH_2S=0.209$, this would correspond to a mean sulfur retention of 99.81%.

The calculated time for complete conversion of the gas is about 360 seconds at 950° C. and atmospheric pressure. The residence time needed for a particle conversion of 0.7 is 420 seconds along with the lime (CaO) flow and inventory. The total flow of sour gas used to produce 450 $MW_{th}$ is about 60,646 Kg/h. The limestone flow injected in the air reactor is approximately 21.45 kg/s in order to handle the amount of $H_2S$ in the sour gas. The corresponding lime (CaO) flow is approximately 12 kg/s. The temperature at the level of the lime bed (e.g., within the fuel reactor) is between about 700 and 1200° C., preferably between about 850 and 1040° C. The outlet temperature in the riser is increased to approximately 1050° C.

The ratio of Ca to S is between about 1 and 3, preferably between about 1.2 and 2.5. The $CaSO_4$ recirculated from the air reactor is approximately 1.83 tonnes/second. In the riser, the recirculated $CaSO_4$ reacts with $CH_4$ from the sour gas to produce the syngas with the following specification (wt %): CO (27.0%), $H_2$ (55.1%), $CO_2$ (3.4%), $H_2O$ (8.5%), $N_2$ (6.1%), and $H_2S$ (397.0 ppm).

As explained above, the present invention is directed to a calcium looping combustion of sour gas that includes in-situ $H_2S$ removal, oxygen transfer media production, and syngas production. The method according to the invention allows full conversion of the sour gas in contrast with previous CLC processes. The method according to the invention reduces the reaction time in the fuel reactor which allows for the reductions in the size of the fuel reactor and the overall cost of the chemical looping unit. Additionally, the method according to invention allows for an exothermic reaction in the fuel reactor between the sour gas and the bed of lime, which increases the total efficiency of the calcium looping unit.

While the present invention has been described above using specific embodiments and examples, there are many variations and modifications that will be apparent to those having ordinary skill in the art. As such, the described variations and embodiments are to be considered in all respects as illustrative, and not restrictive. Therefore, the scope of the invention is indicated by the appended claims, rather than by the foregoing description. All changes that come within the meaning and range of equivalency of the claims are to be embraced within their scope.

What is claimed is:

1. A process for in-situ removal of sulfur, oxygen transfer media production, and sour gas combustion using calcium looping combustion while producing a product stream, comprising the steps of:
    calcining $CaCO_3$ in an air reactor to produce a calcium-based transfer media;
    transferring the calcium-based transfer media from the air reactor to a fuel reactor;
    delivering sour gas into the fuel reactor;
    reducing the calcium-based transfer media disposed within the fuel reactor to provide gas-phase oxygen;
    oxidizing the reduced calcium-based transfer media with air in the air reactor to produce a calcium-based oxygen transfer media;
    delivering the calcium-based oxygen transfer media from the air reactor to a riser;
    transferring sour gas without $H_2S$ from the fuel reactor to the riser;
    combusting the sour gas without $H_2S$ within the riser to produce the product stream which includes the reduced calcium-based transfer media;
    removing the reduced calcium-based transfer media from the product stream;
    re-oxidizing the reduced calcium-based transfer media with air in the air reactor to produce the calcium-based oxygen transfer media; and
    delivering the calcium-based oxygen transfer media back to the riser.

2. The process of claim 1, wherein the calcium-based transfer media comprises a bed that is disposed on a perforated substrate that is disposed in a lower portion of the fuel reactor.

3. The process of claim 2, wherein the bed is fluidized by a stream of $CO_2$, steam, or depleted air from the air reactor or a combination thereof.

4. The process of claim 3, wherein the depleted air contains 2 to 5% of $O_2$.

5. The process of claim 1, wherein the calcium-based transfer media is CaO.

6. The process of claim 1, wherein the reduced calcium-based transfer media is CaS.

7. The process of claim 1, wherein the calcium-based oxygen transfer media reacts with the sour gas without $H_2S$ in the riser, producing the reduced calcium-based transfer media.

8. The process of claim 1, wherein the sour gas is a feed that flows into an inlet formed in the bottom of the fuel reactor such that the $H_2S$ present in the sour gas reacts with the calcium-based transfer media.

9. The process of claim 1, wherein $CaSO_4$ is the calcium-based oxygen transfer media.

10. The process of claim 1, wherein the calcium-based oxygen transfer media reacts with the methane present in the sour gas without $H_2S$ in the riser, producing the product stream.

11. The process of claim 10, wherein the product stream comprises CO and $H_2$.

12. The process of claim 11, wherein the product stream comprises syngas.

13. The process of claim 1, wherein the reduced calcium-based transfer media is removed from the product stream using a gas-solid separation device.

14. The process of claim 13, wherein the gas-solid separation device is a cyclone.

15. The process of claim 13, wherein the step of removing the reduced calcium-based transfer media from the product stream further comprises the step of delivering the reduced calcium-based transfer media to a hopper, injecting air into the hopper to oxidize the reduce calcium-based transfer media to produce the calcium-based oxygen transfer media, which is delivered to the riser.

16. The process of claim 9, wherein a ratio of Ca/S is between about 1.2 and 2.5.

17. The process of claim 1, wherein heat and steam are generated as products.

18. The process of claim 1, wherein gypsum is generated as a byproduct.

19. The process of claim 1, wherein a portion of the calcium-based transfer media produced by the calcination step is delivered to the riser to react with the $H_2S$ present in the sour gas.

20. A process for in-situ removal of sulfur, oxygen transfer media production, and sour gas combustion using calcium looping combustion while producing a product stream, comprising the steps of:
    calcining $CaCO_3$ in an air reactor to produce a calcium-based transfer media;
    transferring the calcium-based transfer media from the air reactor to a fuel reactor;
    delivering sour gas into the fuel reactor such that the sour gas reacts with the calcium-based transfer media and the calcium-based transfer media is reduced; and
    injecting a calcium-based oxygen transfer media into a riser that is in fluid communication with the fuel reactor, whereby sour gas without $H_2S$ is combusted within the riser to produce the product stream which includes the reduced calcium-based transfer media;
    wherein the step of injecting the calcium-based oxygen transfer media comprises the step of oxidizing the reduced calcium-based transfer media with air in the air reactor to produce the calcium-based oxygen transfer media which is then delivered to the riser.

21. The process of claim 20, further including the step of injecting into the riser the calcium-based transfer media which was produced by the step of calcining the $CaCO_3$ in the air reactor.

22. The process of claim 20, wherein the calcium-based transfer media comprises CaO; the reduced calcium-based transfer media comprises CaS and the calcium-based oxygen transfer media comprises $CaSO_4$.

23. The process of claim 21, wherein the calcium-based transfer media comprises CaO; the reduced calcium-based transfer media comprises CaS and the calcium-based oxygen transfer media comprises $CaSO_4$, and wherein at least a portion of both the CaO and the $CaSO_4$ formed in the air reactor are delivered together to both the fuel reactor and the riser.

24. The process of claim 23, wherein the $CaSO_4$ reacts with methane in the sour gas within the fuel reactor and the riser by providing its oxygen.

25. The process of claim 22, further including the step of removing $SO_2$ from a product stream of the air reactor by reacting the $SO_2$ with a calcium-based sorbent that is injected into the air reactor and reacts with the $SO_2$ to produce $CaSO_4$ which is separated from the product stream of the air reactor.

26. A process for in-situ removal of sulfur, calcium-based oxygen transfer media production, and sour gas combustion using calcium looping combustion while producing a product stream of syngas, comprising the steps of:
    calcining $CaCO_3$ in an air reactor to produce a calcium-based transfer media;
    transferring the calcium-based transfer media from the air reactor to a fuel reactor;
    delivering sour gas into the fuel reactor;
    reducing the calcium-based transfer media disposed within the fuel reactor;
    delivering the reduced calcium-based transfer media from the fuel reactor to the air reactor;
    oxidizing the reduced calcium-based transfer media with air in the air reactor to produce a calcium-based oxygen transfer media;
    delivering the calcium-based oxygen transfer media from the air reactor to a riser;
    transferring sour gas without $H_2S$ from the fuel reactor to the riser;
    combusting the sour gas without $H_2S$ within the riser to produce the syngas product stream which includes the reduced calcium-based transfer media;
    removing the reduced calcium-based transfer media from the product stream;
    re-oxidizing the reduced calcium-based transfer media with air in the air reactor to produce the calcium-based oxygen transfer media; and
    delivering the calcium-based oxygen transfer media back to the riser.

27. The process of claim 26, wherein the syngas produced in the riser is used in a combined cycle turbine to produce electricity.

28. The process of claim 3, wherein the depleted air from the air reactor is used to produce steam and electricity from a steam turbine.

* * * * *